(12) United States Patent
von Haugwitz

(10) Patent No.: US 10,768,588 B2
(45) Date of Patent: Sep. 8, 2020

(54) APPARATUS AND METHOD FOR CONTROLLING A PLURALITY OF VISUAL INDICATING ELEMENTS OF AT LEAST ONE ELECTRONIC DEVICE

(71) Applicant: Pilz GmbH & Co. KG, Ostfildern (DE)

(72) Inventor: Frank von Haugwitz, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 16/352,533

(22) Filed: Mar. 13, 2019

(65) Prior Publication Data

US 2019/0294130 A1    Sep. 26, 2019

(30) Foreign Application Priority Data

Mar. 21, 2018 (DE) .......................... 10 2018 106 708

(51) Int. Cl.
    *G08B 23/00*      (2006.01)
    *G05B 15/02*      (2006.01)
    (Continued)

(52) U.S. Cl.
    CPC .............. *G05B 15/02* (2013.01); *G05B 9/02* (2013.01); *G05B 19/406* (2013.01); *G09G 3/14* (2013.01);
    (Continued)

(58) Field of Classification Search
    CPC .......... G09G 3/14; G08B 23/00; G08B 21/18; G05B 15/02; G05B 19/406; G05B 9/02
    See application file for complete search history.

(56) References Cited

U.S. PATENT DOCUMENTS

| | | | |
|---|---|---|---|
| 2005/0237217 A1 | 10/2005 | Rudolph et al. | |
| 2008/0030362 A1* | 2/2008 | Huang | H04L 41/0681 340/815.45 |
| 2017/0221322 A1* | 8/2017 | Ignomirello | F21V 5/00 |

FOREIGN PATENT DOCUMENTS

| | | |
|---|---|---|
| DE | 10325747 A1 | 5/2004 |
| DE | 10360662 A1 | 7/2005 |

(Continued)

OTHER PUBLICATIONS

Search Report in corresponding European Patent Application No. 19158316.0, dated Apr. 4, 2019, with English translation.

*Primary Examiner* — Toan N Pham
(74) *Attorney, Agent, or Firm* — Edell, Shapiro & Finnan, LLC.

(57) ABSTRACT

An apparatus is described for controlling a plurality k of visual indicating elements of at least one electronic device, where k≥2, wherein each of the indicating elements is configured to emit light for visual indication of an operating status of the at least one electronic device and/or individual components of the at least one electronic device. The apparatus comprises at least one evaluation and control unit connected to the indicating elements to control intensities of light emitted from the indicating elements to cause the indicating elements emit light having defined intensities during a normal operating mode and, during an operating action of the at least one electronic device, to visually accentuate one or more of the indicating elements that are assigned to the operating action by changing relative intensities of the light emitted from the indicating elements.

11 Claims, 3 Drawing Sheets

(51) Int. Cl.
  *G05B 9/02*    (2006.01)
  *G05B 19/406*  (2006.01)
  *G09G 3/14*    (2006.01)

(52) U.S. Cl.
  CPC .............. *G05B 2219/23157* (2013.01); *G05B 2219/23169* (2013.01); *G09G 2354/00* (2013.01)

(56) References Cited

FOREIGN PATENT DOCUMENTS

| | | |
|---|---|---|
| DE | 102008027981 A1 | 12/2009 |
| DE | 102008032823 B4 | 1/2017 |
| EP | 2238813 B1 | 8/2011 |

* cited by examiner

APPARATUS AND METHOD FOR CONTROLLING A PLURALITY OF VISUAL INDICATING ELEMENTS OF AT LEAST ONE ELECTRONIC DEVICE

CROSS REFERENCE TO RELATED APPLICATIONS

This application claims foreign priority under 35 U.S.C. § 119(a)-(d) to Application No. DE 102018106708.9 filed on Mar. 21, 2018, the entire contents of which are hereby incorporated by reference.

TECHNICAL FIELD

The present disclosure relates to an apparatus and a method for controlling a plurality k of visual indicating elements of at least one electronic device, where $k \geq 2$, wherein each of the indicating elements is configured to emit light for the visual indication of an operating status of the at least one electronic device and/or individual components of the at least one electronic device.

BACKGROUND

Visual indicating elements, in particular, light emitting diodes, serve the purpose of visually indicating to a user, for example, various operating states of at least one electronic device and/or individual components of the at least one electronic device in a simple and readily detectable manner. Such an electronic device may be, for example, a control apparatus, in particular, a safety control apparatus that can be used in the field of automation technology. If the operator carries out an operating action, such as, for example, an operator input, it is often only necessary to pay attention to individual indicating elements of the at least one electronic device, where each indicating element is assigned to the current operator input. For example, the indicating elements may change their illumination status in response to the operating action of the operator, for example, emit light in a different color and/or change a flashing state. If the electronic device comprises a plurality of indicating elements, then it is often difficult for the operator to quickly detect the indicating elements, which are assigned to the current operating action and, therefore, to pay particular attention to the indicating elements. Because at the time of the operating action it is not possible to distinguish between indicating elements, to which attention should actually be paid on account of the operating action, and the indicating apparatuses, which are not immediately relevant at this point in time.

SUMMARY

An object of what is described is to provide an apparatus and a method that are intended for controlling a plurality k of visual indicating elements of at least one electronic device, where $k \geq 2$, and by which the operability of the at least one electronic device can be improved.

An inventive apparatus for controlling a plurality $k \geq 2$ of visual indicating elements of at least one electronic device is characterized by the feature that the apparatus comprises at least one evaluation and control unit, which is connected to the indicating elements and which is configured to control the intensities of the light, emitted from the indicating elements, such that the indicating elements emit light having defined, preferably in essence identical, intensities during a normal operating mode and that during an operating action of the at least one electronic device one or more indicating elements, which are assigned to the operating action, can be visually accentuated by changing the relative intensities of the light emitted from the indicating elements. The term "normal operating mode" shall denote in this context an operation of the at least one electronic device, during which no operating actions by the operator are carried out. The described concept is based on the idea of visually accentuating in a targeted manner the individual indicating elements, to which the operator should pay particular attention and which are assigned, as required, to the operating action, during an operating action, by changing the relative intensities of the visual indicating elements by the evaluation and control unit, which can also evaluate the operating actions of the operator. The result is that after an operating action the operator is able to quickly detect the status of the accentuated indicating elements that are assigned to the operating action. Preferably the indicating elements can be designed as light emitting diodes. Light emitting diodes are characterized, in particular, by their long life and by their relatively low energy consumption. Furthermore, the brightness of light emitting diodes can be varied in a very simple way, in particular, by a pulse width modulation method.

It is proposed in an advantageous implementation that the evaluation and control unit be configured to control the intensities of the indicating elements such that the intensities of those indicating elements, which are assigned to the operating action, are unchanged in comparison to the normal operating mode and that the intensities of the rest of the indicating elements are decreased in comparison to the normal operating mode. As a result, the rest of the indicating elements in this implementation are dimmed down in a targeted manner, whereas the indicating elements, to which the operator should pay attention owing to the operating action, emit light having an intensity that corresponds to the intensity during the normal operating mode of the electronic device. Hence, the intensity of the indicating elements, which do not absolutely require the attention of the operator as a result of the operating action, is reduced in a targeted manner, in order to visually accentuate the indicating elements that have not been dimmed down. In this case there is also the option that the indicating elements, which do not absolutely require the attention of the operator as a result of the operating action, are totally deactivated by the evaluation and control unit. Then, however, the status of these indicating elements can no longer be detected.

In an alternative implementation, there is the option that the evaluation and control unit is configured to control the intensities of the indicating elements such that the intensities of those indicating elements, which are assigned to the operating action, are increased in comparison to the normal operating mode and that the intensities of the rest of the indicating elements are unchanged in comparison to the normal operating mode. Thus, in this implementation, those indicating elements, which relate to the present operating action and, thus, require the attention of the operator, are dimmed up in a targeted manner, whereas the intensities of the rest of the indicating elements are not changed.

In an additional alternative implementation, it may also be provided that the evaluation and control unit is configured to control the intensities of the indicating elements such that the intensities of those indicating elements, which are assigned to the operating action, are increased in comparison to the normal operating mode and that the intensities of the rest of the indicating elements are decreased in comparison to the normal operating mode. Thus, in this implementation, the intensities of all of the indicating elements of the electronic device are changed.

The described method is characterized by the feature that the intensities of the light, emitted from the indicating elements, are controlled such that during a normal operating mode the indicating elements emit light having defined, preferably in essence identical, intensities and that during an operating action of the at least one electronic device one or more indicating elements, which are assigned to the operating action, are visually accentuated by changing the relative intensities of the light emitted from the indicating elements. Thus, in the described method, individual indicating elements, to which the operator should pay particular attention and which are assigned, as required, to the operating action, are visually accentuated in a targeted way by changing the relative intensities of the visual indicating elements so that, as a result, the operator after having carried out an operating action can quickly detect the status of the indicating elements of the electronic device that require attention and are, therefore, visually accentuated. As a result, the operation of the electronic device is designed in a way that is simpler and more intuitive.

It is proposed in an advantageous implementation that the intensities of the indicating elements be controlled such that the intensities of those indicating elements, which are assigned to the operating action, are not changed in comparison to the normal operating mode and that the intensities of the rest of the indicating elements are decreased in comparison to the normal operating mode. As a result, the rest of the indicating elements, which are less relevant for the current operating action, are dimmed down in a targeted manner, so that the indicating elements, to which the operator should pay attention following the operator input and the intensities of which are not changed in comparison to the normal operating mode, are visually accentuated and can be quickly detected by the operator. There is also the option that the indicating elements, which do not absolutely require the attention of the operator as a result of the operating action, are totally deactivated. This results in a particularly strong visual accentuation of the indicating elements, to which attention should be paid after the operating action has been carried out.

It can be provided in an alternative implementation that the intensities of the indicating elements are controlled such that the intensities of those indicating elements, which are assigned to the operating action, are increased in comparison to the normal operating mode and that the intensities of the rest of the indicating elements are not changed in comparison to the normal operating mode. As a result, in this implementation, the indicating elements, to which the operator should pay attention following the operating action, are dimmed up in a targeted manner.

In another alternative implementation there is the option that the intensities of the indicating elements are controlled such that the intensities of those indicating elements, which are assigned to the operating action, are increased in comparison to the normal operating mode and that the intensities of the rest of the indicating elements are decreased in comparison to the normal operating mode. Thus, the relative intensities of all of the indicating elements are changed after the operating action.

Furthermore, the disclosure relates, according to another aspect, to an electronic device, preferably a control apparatus, in particular, a safety control apparatus, comprising a plurality $k \geq 2$ of visual indicating elements, where in this case each of the visual indicating elements is configured to emit light for the visual indication of an operating status of the at least one electronic device and/or individual components of the at least one electronic device, and an apparatus for controlling the visual indicating elements. This electronic device is characterized by the feature that the apparatus for controlling the visual indicating elements results in a targeted visual accentuation of individual indicating elements of the electronic device during an operating action.

According to another aspect, there is described a distributed system comprising a first electronic device and at least a second electronic device, both of which being in communication link with one another. The application of the concept, explained above, to distributed systems, which comprise at least two electronic devices, has the advantage that when an operating action is carried out on one of the at least two electronic devices, the indicating elements, which are assigned to the operating action and which are part of the respective electronic device, can be visually accentuated in the manner described above. Furthermore, the brightness of the indicating elements of the other electronic device or alternatively (in the case of $k \geq 3$ electronic devices) the other electronic devices can be reduced in an advantageous manner, for example, in a targeted manner, so that the operator can easily detect those electronic devices of the distributed system, on which the operator input is having an effect.

At this point it should be stressed that the fundamental status of the indicating elements with respect to the significance of the luminous color and/or the flashing status does not change by changing the relative intensities of the indicating elements in a targeted way. Thus, the change in the relative intensities does not change the information regarding the status of the electronic device, the status information being visualized by the indicating elements. Only individual indicating elements are visually accentuated, so that they can be detected more readily.

BRIEF DESCRIPTION OF THE DRAWINGS

Other features and advantages of the disclosed apparatus and method will become apparent by the following description of preferred example implementations with reference to the accompanying drawings.

DETAILED DESCRIPTION

Figure 1:
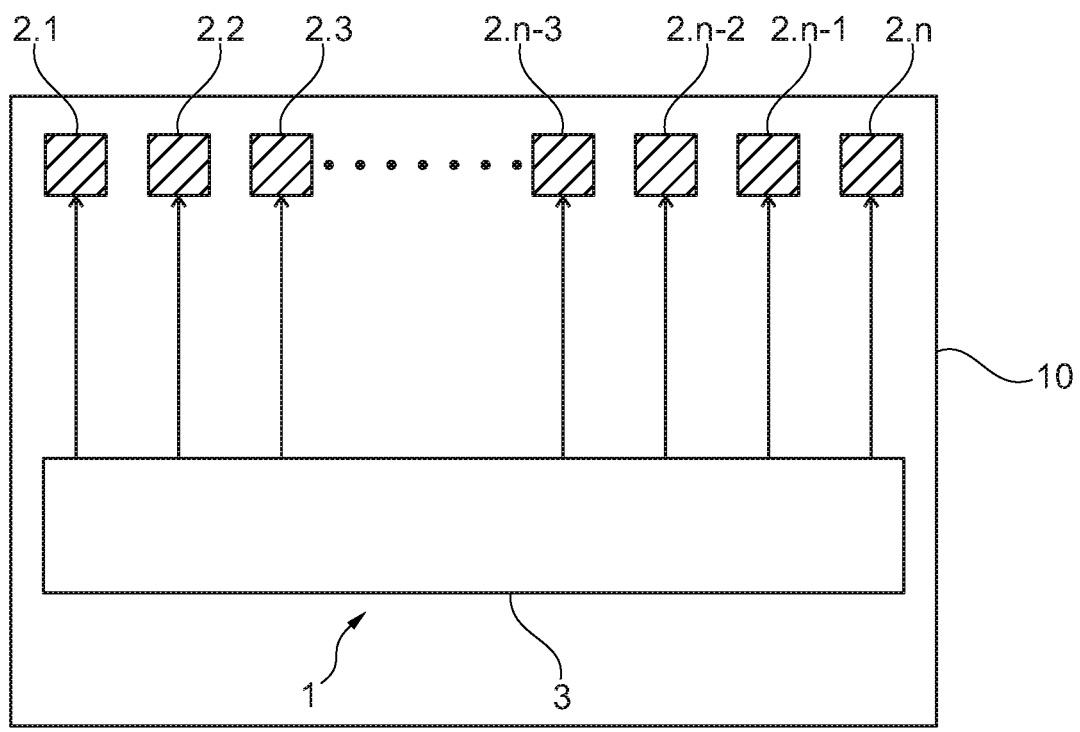
FIG. 1 shows in schematic form a highly simplified representation of an electronic device with an apparatus for controlling a plurality of visual indicating elements of the electronic device in a first illumination state of the visual indicating elements.

With reference to FIG. 1, an electronic device 10, which may be, for example, a control apparatus, in particular, a safety control apparatus, which can be used in the field of automation technology, comprises a plurality of visual indicating elements 2.1 to 2.$n$. Each of these visual indicating elements 2.1 to 2.n may comprise, for example, at least one monochromatic or at least one polychromatic light emitting diode.

Information about a current status of the electronic device 10 and/or individual components of the electronic device 10, which can also be built, for example, in a modular design, can be visually signaled to a user by the visual indicating elements 2.1 to 2.n. For example, when the electronic device 10 is in operation, the indicating elements 2.1 to 2.n may emit light in various signal colors, which are assigned to various operating states of the electronic device 10 or, more specifically, to the components thereof. As a result, various operating states of the electronic device 10 or, more specifically, the components thereof can be signaled to the operator. As a result, it is possible, for example, to indicate any malfunction of the electronic device 10 or, more specifically, individual components of the electronic device 10. There is also the option, for example, that one or more of the indicating elements 2.1 to 2.n can be driven such that they are periodically switched on or off, so that a flashing function can be implemented.

Furthermore, the electronic device 10 presented in this implementation has an apparatus 1 that is intended for controlling the visual indicating elements 2.1 to 2.n and which comprises an evaluation and control unit 3, which is connected to the indicating elements 2.1 to 2.n and which is configured to control the lighting operation of the visual indicating elements 2.1 to 2.n. The evaluation and control unit 3 is designed such that it can detect and evaluate the operating actions of a user and can drive the visual indicating elements 2.1 to 2.n accordingly.

During a normal operating mode of the electronic device 10, in which the operator does not carry out any operating actions whatsoever, the indicating elements 2.1 to 2.n are driven by the evaluation and control unit 3 preferably such that the indicating elements emit light having a defined, in particular, in essence identical, intensity. As a result, the indicating elements 2.1 to 2.n have a uniform visual appearance with respect to the intensity of the emitted light, even though the indicating elements may glow, as required, in various signal colors. In the normal operating mode, none of the indicating elements 2.1 to 2.n is visually accentuated.

If a user carries out an operating action, such as, for example, an operator input, on the electronic device 10, then in many cases it is only necessary that the user pay attention to the illumination status or, more specifically, the changes in the illumination status of individual indicating elements 2.1 to 2.n. If all of the indicating elements 2.1 to 2.n are in operation and emit light with an essentially identical intensity (brightness), then under some circumstances it may be difficult for the user to quickly detect the indicating elements 2.1 to 2.n that are actually relevant during the current operating action, since the user cannot distinguish them at first glance from the rest of the indicating elements 2.1 to 2.n that are not relevant for the current operating action.

Therefore, the evaluation and control unit 3 is configured to control the brightness of the indicating elements 2.1 to 2.n such that, depending on the current operating action, those indicating elements 2.1 to 2.n are accentuated that relate to this operating action and are assigned, as required, to this operating action. The evaluation and control unit 3 is designed such that it can change the relative light intensities of the indicating elements 2.1 to 2.n of the electronic device 10. This results in a corresponding visual accentuation of the indicating elements 2.1 to 2.n, which are relevant during the operating action, as compared to the rest of the indicating elements 2.1 to 2.n of the electronic device 10. This aspect shall be explained in greater detail below.

To begin with, FIG. 1 shows the starting situation, in which all of the indicating elements 2.1 to 2.n are driven by the evaluation and control unit 3 in the normal operating mode of the electronic device 10 such that the indicating elements glow with the same intensity (or, more specifically, at least almost the same intensity). This feature is indicated by identical cross hatchings of the respective indicating elements 2.1 to 2.n in FIG. 1.

Figure 2:
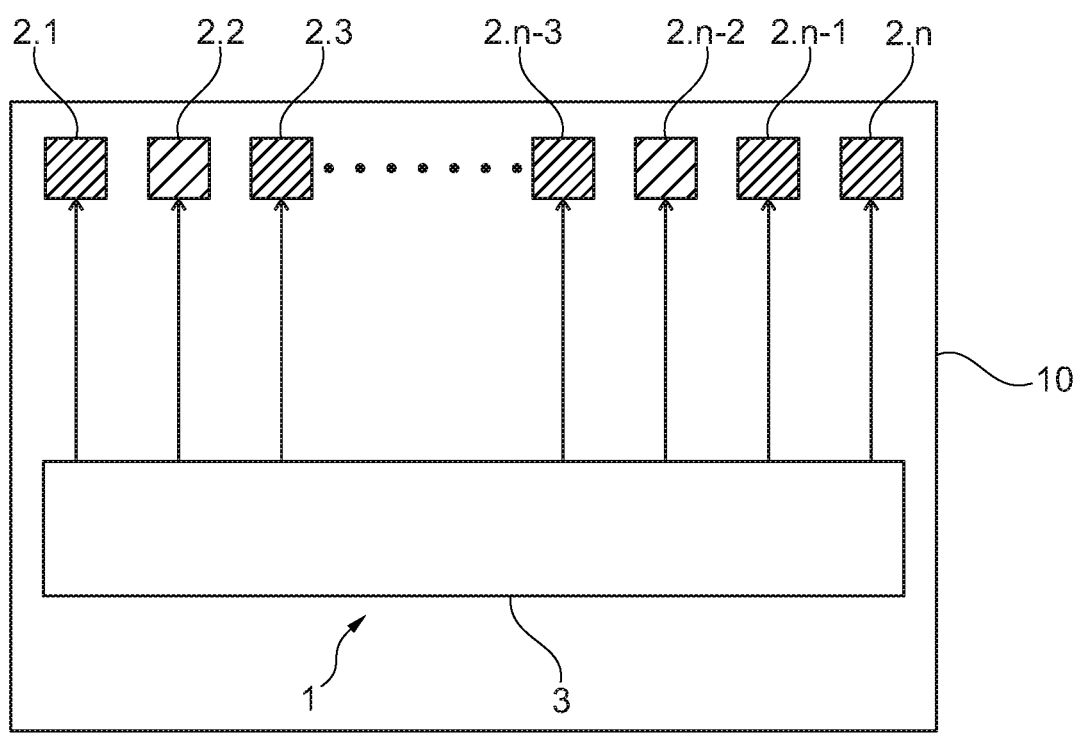
FIG. 2 shows in schematic form a highly simplified representation of the electronic device from FIG. 1 in a second illumination state of the visual indicating elements.

With reference to FIG. 2, the control of the intensities of the indicating elements 2.1 to 2.n by the evaluation and control unit 3 during an operating action shall now be explained in greater detail. In this case it shall be assumed that for the present operating action a specific status of the electronic device 10, which is represented by the two indicating elements 2.2 and 2.n−2, is of particular importance and, therefore, requires the attention of the operator.

The control of the light intensities of the indicating elements 2.1 to 2.n by the evaluation and control unit 3 may take place such that the intensities of those indicating elements 2.2 and 2.n−2, which are particularly relevant for the present operating action, and are assigned, as required, to the operating action, are not changed with respect to the situation shown in FIG. 1, whereas the intensities of the rest, less relevant indicating elements 2.1, 2.3 to 2.n−3, 2.n−1, 2.n are decreased accordingly. This decrease in the intensities has been illustrated by stronger cross hatchings of the indicating elements 2.1, 2.3 to 2.n−3, 2.n−1, 2.n in FIG. 3, whereas the cross hatchings of the two indicating elements 2.2 and 2.n−2, the intensity of which was not changed, correspond to those in FIG. 1. Thus, in this example implementation, those indicating elements 2.1, 2.3 to 2.n−3, 2.n−1, 2.n, which do not require as much attention for the current operating action, are darkened by decreasing the light intensities, so that, as a result, the two indicating elements 2.2 and 2.n−2 with the light intensities, which are unchanged in comparison to FIG. 1, are visually accentuated. Hence, after carrying out the operating action, the operator can quickly detect the status of the respective, visually accentuated indicating elements 2.2 and 2.n−2. Preferably the indicating elements 2.1, 2.3 to 2.n−3, 2.n−1, 2.n, which are not to be accentuated during the operating action, are not totally darkened, but rather dimmed down, so that the status thereof—even if with less light intensity—can still be detected by the operator. As a result, the relative intensities of the indicating elements 2.1 to 2.n are changed by visually accentuating the indicating elements 2.2 and 2.n−2 that require the attention of the operator.

In principle, there is also the option in this implementation that the indicating elements 2.1, 2.3 to 2.n−3, 2.n−1, 2.n, which are not to be accentuated, are completely deactivated (switched off) by the evaluation and control unit 3, so that only the visually accentuated indicating elements 2.2 and 2.n−2 continue to glow. Then, however, it will no longer be possible to read the status of the rest of the indicating elements 2.1, 2.3 to 2.n−3, 2.n−1, 2.n, which are no longer glowing.

Figure 3:
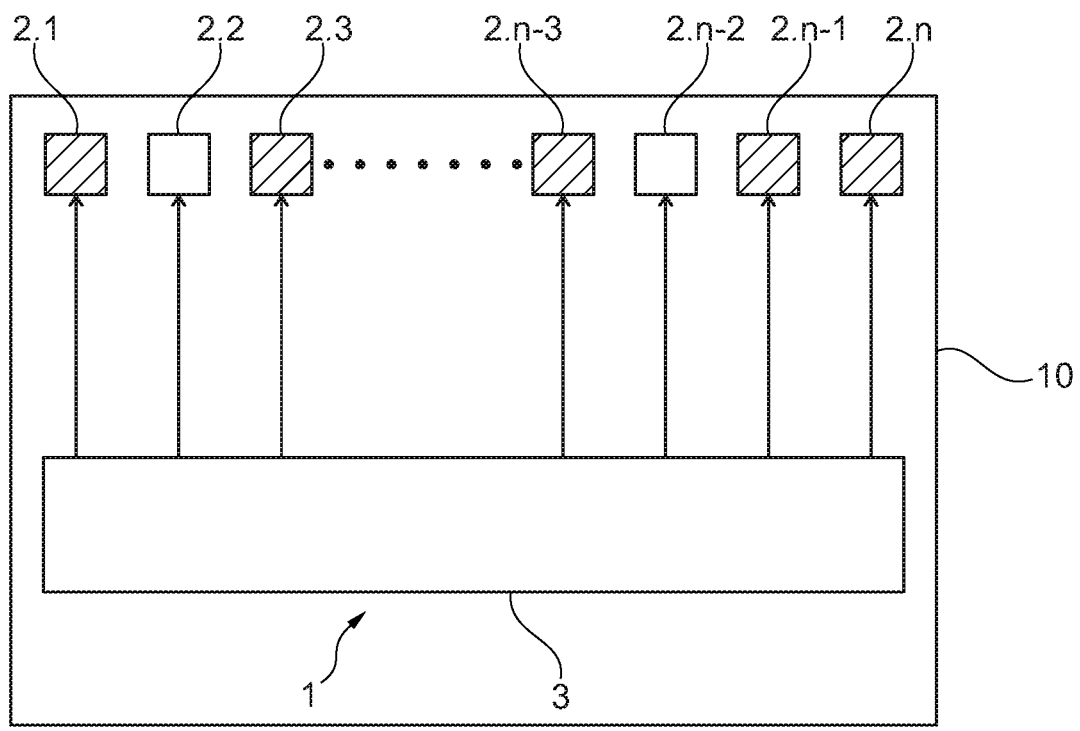
FIG. 3 shows in schematic form a highly simplified representation of the electronic device from FIG. 1 in a third illumination state of the visual indicating elements.

With reference to FIG. 3, the control of the light intensities of the indicating elements 2.1 to 2.n can also take place by the evaluation and control unit 3 in an alternative implementation such that the intensities of the indicating elements 2.2 and 2.n−2, to which particular attention should be paid during the operating action, are increased, as compared to the state, shown in FIG. 1, in a targeted manner, whereas the intensities of the rest of the indicating elements 2.1, 2.3 to 2.n−3, 2.n−1, 2.n are not changed. The higher intensities, in comparison to FIG. 1, of the indicating elements 2.2 and 2.n–2, to which attention should be paid during the operating action, have been illustrated in FIG. 2 by the absence of the cross hatchings. The cross hatchings of those indicating elements 2.1, 2.3 to 2.n–3, 2.n–1, 2.n, the brightness of which was not changed, correspond logically to the cross hatchings in FIG. 1.

Figure 4:
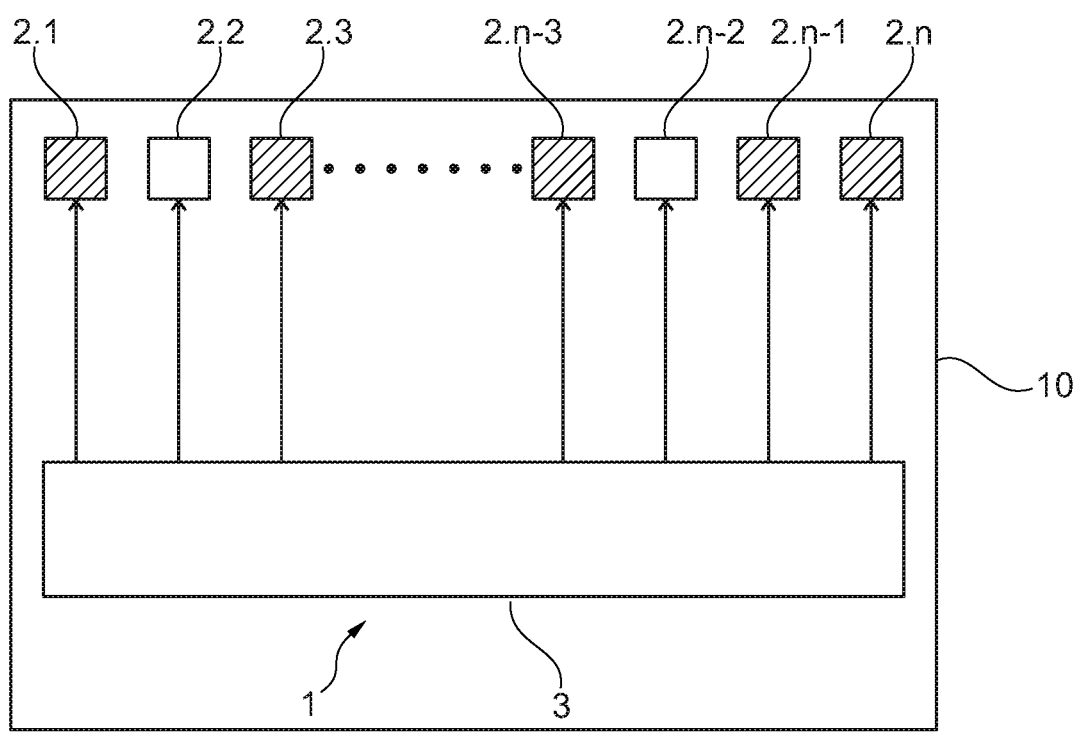
FIG. 4 shows in schematic form a highly simplified representation of the electronic device from FIG. 1 in a fourth illumination state of the visual indicating elements.

It is also possible in an additional alternative variant, which is shown in FIG. 4, that the intensities of the indicating elements 2.2 and 2.n–2, to which particular attention should be paid during the operating action, are increased by the evaluation and control unit 3; and the intensities of the rest of the indicating elements 2.1, 2.3 to 2.n–3, 2.n–1, 2.n are decreased. This aspect has been illustrated in turn by the corresponding cross hatchings. In this case the rest of the indicating elements 2.1, 2.3 to 2.n–3, 2.n–1, 2.n, to which less attention has to be paid during the operating action, can also be deactivated, if necessary.

After the operating action the light colors and/or the flashing states of the indicating elements 2.2 and 2.n–2, which are assigned to the operating action, may change. It should be noted in this context that in all of the implementations, the fundamental status of the indicating elements 2.1 to 2.n with respect to the significance of the light colors and the flashing states does not change as a result of the change in the relative intensities of the indicating elements 2.1 to 2.n for the visual accentuation of specific indicating elements 2.2 and 2.n–2. Therefore, in other words the visual accentuation of specific indicating elements 2.2 and 2.n–2 has no influence on the significance of the light colors and the flashing states.

The above explained principle of the visual accentuation of individual indicating elements 2.1 to 2.n by changing the relative intensities of the indicating elements 2.1 to 2.n also lends itself to a distributed system 100, in particular, an automation system, which comprises at least two electronic devices 10, 10' of the type explained above and which are in communication link with one another, so that the evaluation and control units 3, 3' of the apparatuses 1, 1' for controlling the visual indicating elements 2.1 to 2.n, 2.1' to 2n' of the electronic devices 10, 10' can exchange information with one another on a bi-directional path. This situation is shown by way of an example using two electronic devices 10, 10', which are networked with one another, in FIG. 5

If the operator carries out an operating action, which relates only to one of the electronic devices 10, 10' of the distributed system 100, then the intensities of the indicating elements 2.1 to 2.n, 2.1' to 2n' of the electronic devices 10, 10' can be adapted by the evaluation and control units 3, 3' such that specific indicating elements 2.1 to 2.n, 2.1' to 2n' of the electronic devices 10, 10' are accentuated in a targeted way.

It shall be assumed at this point that the present operating action relates to a first electronic device 10 of the distributed system 100 and that for this operating action in turn particular attention is to be paid by the operator to the visual indicating elements 2.2 and 2.n–2 of the first electronic device 10. In this implementation, the rest of the indicating elements 2.1, 2.3 to 2.n–3, 2.n–1, 2.n of the first electronic device 10 are driven—analogous to the example implementation according to FIG. 2—by the evaluation and control unit 3 of the electronic device such that the intensities of the indicating elements are decreased as compared to the normal operating mode, in which no operating actions are carried out.

In contrast, the indicating elements 2.2 and 2.n–2, which require the attention of the operator during the operating action and which are a part of the first electronic device 10, are still driven such that the intensities of the indicating elements do not change, as compared to the normal operating mode. Optionally the rest of the indicating elements 2.1, 2.3 to 2.n–3, 2.n–1, 2.n of the first electronic device 10 can also be completely deactivated by the evaluation and control unit 3.

Furthermore, the evaluation and control unit 3 of the first electronic device 10 signals the evaluation and control unit 3' of the second electronic device 10' that an operating action was carried out on the first electronic device 10. Thus, the evaluation and control unit 3' of the second electronic device 10' is designed such that it can reduce in response thereto the intensities of all of the indicating elements 2.1' to 2.n' of the second electronic device 10' as compared to the normal operating mode. Optionally the indicating elements 2.1' to 2.n' of the second electronic device 10' can also be completely deactivated.

As a result of the measures described above, the indicating elements 2.2 and 2.n–2, which require the attention of the operator and which are a part of the first electronic device 10, can be visually accentuated, as compared to the rest of the visual indicating elements 2.1, 2.3 to 2.n–3, 2.n–1, 2.n of the first electronic device 10 and as compared to all of the indicating elements 2.1' to 2n' of the second electronic device 10'. As a result, the operator can quickly detect the electronic devices 10, 10' of the distributed system 100, on which an operating action has been carried out. In this case the corresponding status of the indicating elements 2.2 and 2.n–2, to which attention has to be paid and which are part of the first electronic device 10, can be read very easily.

Figure 5:
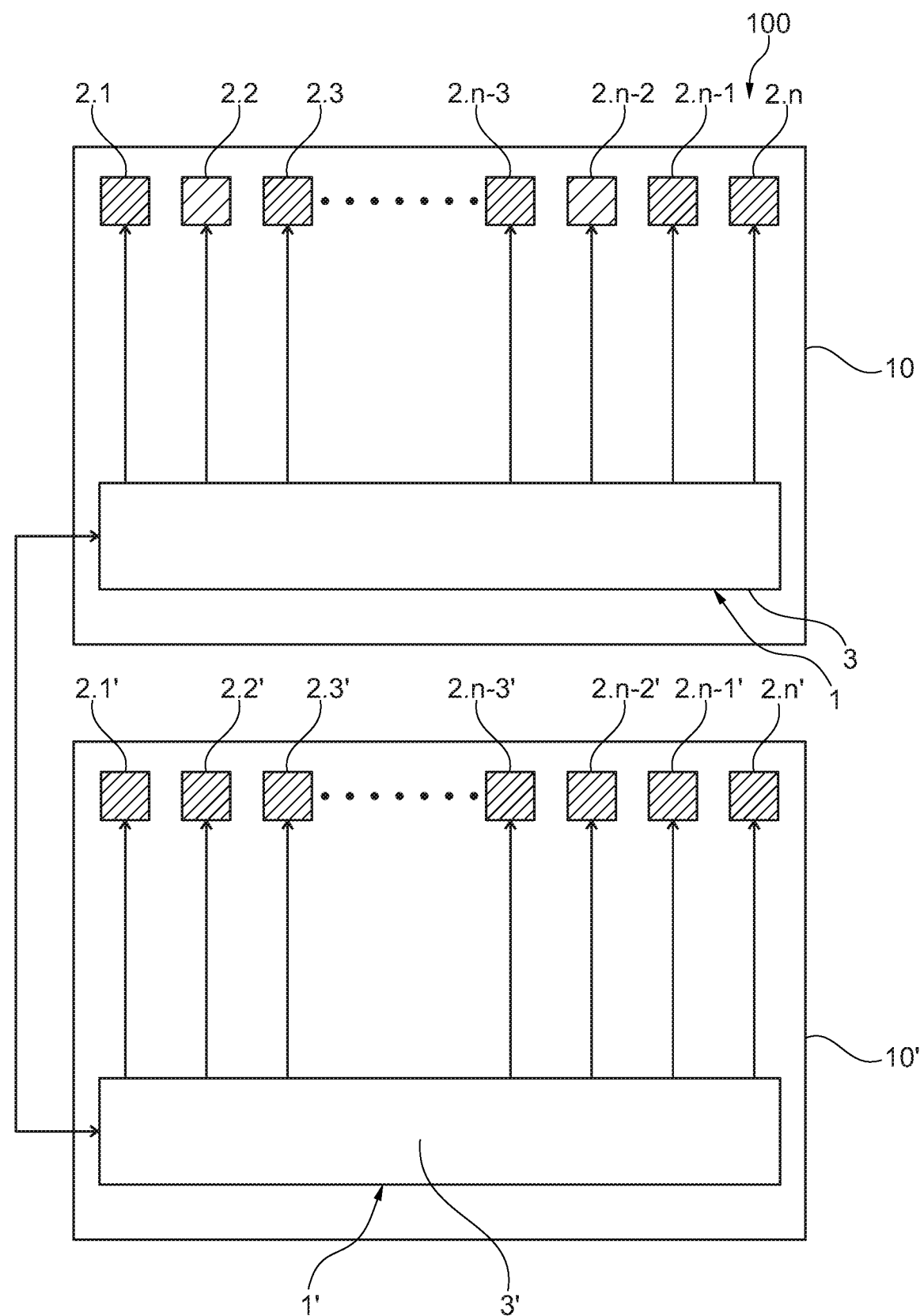
FIG. 5 shows in schematic form a highly simplified representation of a distributed system with two electronic devices from FIG. 1, with the electronic devices being in communication link with one another.

In conclusion, it should be noted that the additional concepts, which are shown in FIGS. 3 and 4 and which are intended for the visual accentuation of individual indicating elements 2.1 to 2.n, 2.1' to 2n', may also be applied to the distributed system 100, shown in FIG. 5.

What is claimed is:

1. An apparatus for controlling a plurality k of visual indicating elements of at least one electronic device, where k≥2, wherein each of the indicating elements is configured to emit light for visual indication of an operating status of the at least one electronic device or individual components of the at least one electronic device or both the at least one electronic device and individual components of the at least one electronic device, the apparatus comprising:
at least one evaluation and control unit connected to the indicating elements to control intensities of light emitted from the indicating elements during a normal operating mode to cause the indicating elements to emit light having defined intensities, and to control the intensities of the light emitted from the indicating elements during an operating action of the at least one electronic device to visually accentuate one or more of the indicating elements that are assigned to the operating action by changing relative intensities of the light emitted from the indicating elements such that the intensities of those indicating elements that are assigned to the operating action are unchanged in comparison to the normal operating mode and such that the intensities of others of the indicating elements are decreased in comparison to the normal operating mode.

2. The apparatus of claim 1, wherein the defined intensities of the indicating elements during normal operating mode are substantially the same.

3. An apparatus for controlling a plurality k of visual indicating elements of at least one electronic device, where k≥2, wherein each of the indicating elements is configured to emit light for visual indication of an operating status of the at least one electronic device or individual components of the at least one electronic device or both the at least one electronic device and individual components of the at least one electronic device, the apparatus comprising:
  at least one evaluation and control unit connected to the indicating elements to control intensities of light emitted from the indicating elements during a normal operating mode to cause the indicating elements to emit light having defined intensities, and to control the intensities of the light emitted from the indicating elements during an operating action of the at least one electronic device to visually accentuate one or more of the indicating elements that are assigned to the operating action by changing relative intensities of the light emitted from the indicating elements such that the intensities of those indicating elements that are assigned to the operating action are increased in comparison to the normal operating mode and such that the intensities of others of the indicating elements are unchanged in comparison to the normal operating mode.

4. The apparatus of claim 3, wherein the defined intensities of the indicating elements during normal operating mode are substantially the same.

5. An apparatus for controlling a plurality k of visual indicating elements of at least one electronic device, where k≥2, wherein each of the indicating elements is configured to emit light for visual indication of an operating status of the at least one electronic device or individual components of the at least one electronic device or both the at least one electronic device and individual components of the at least one electronic device, the apparatus comprising:
  at least one evaluation and control unit connected to the indicating elements to control intensities of light emitted from the indicating elements during a normal operating mode to cause the indicating elements to emit light having defined intensities, and to control the intensities of the light emitted from the indicating elements during an operating action of the at least one electronic device to visually accentuate one or more of the indicating elements that are assigned to the operating action by changing relative intensities of the light emitted from the indicating elements such that the intensities of those indicating elements that are assigned to the operating action are increased in comparison to the normal operating mode and such that the intensities of others of the indicating elements are decreased in comparison to the normal operating mode.

6. The apparatus of claim 5, wherein the defined intensities of the indicating elements during normal operating mode are substantially the same.

7. A method for controlling a plurality k of visual indicating elements of at least one electronic device, where k≥2, wherein each of the indicating elements is configured to emit light for visual indication of an operating status of the at least one electronic device or individual components of the at least one electronic device or both the at least one electronic device and individual components of the least one electronic device, the method comprising:
  controlling intensities of light emitted from the indicating elements during a normal operating mode to cause the indicating elements to emit light having defined intensities; and
  controlling intensities of the light emitted from the indicating elements during an operating action of the at least one electronic device to visually accentuate one or more of the indicating elements that are assigned to the operating action by changing relative intensities of the light emitted from the indicating elements such that:
    the intensities of those indicating elements that are assigned to the operating action are unchanged in comparison to the normal operating mode and the intensities of others of the indicating elements are decreased in comparison to the normal operating mode; or
    the intensities of those indicating elements that are assigned to the operating action are increased in comparison to the normal operating mode and the intensities of others of the indicating elements are unchanged in comparison to the normal operating mode; or
    the intensities of those indicating elements that are assigned to the operating action are increased in comparison to the normal operating mode and the intensities of others of the indicating elements are decreased in comparison to the normal operating mode.

8. The method of claim 7, wherein the defined intensities of the indicating elements during normal operating mode are substantially the same.

9. An electronic device comprising:
  a plurality k of visual indicating elements, where k≥2, wherein each of the visual indicating elements is configured to emit light for visual indication of an operating status of the at least one electronic device or individual components of the at least one electronic device or both the at least one electronic device and individual components of the at least one electronic device; and
  an apparatus to control the visual indicating elements, the apparatus comprising:
    at least one evaluation and control unit connected to the indicating elements to control intensities of light emitted from the indicating elements during a normal operating mode to cause the indicating elements to emit light having defined intensities, and to control the intensities of the light emitted from the indicating elements during an operating action of the at least one electronic device to visually accentuate one or more of the indicating elements that are assigned to the operating action by changing relative intensities of the light emitted from the indicating elements such that:
      the intensities of those indicating elements that are assigned to the operating action are unchanged in comparison to the normal operating mode and the intensities of others of the indicating elements are decreased in comparison to the normal operating mode; or
      the intensities of those indicating elements that are assigned to the operating action are increased in comparison to the normal operating mode and the intensities of others of the indicating elements are unchanged in comparison to the normal operating mode; or
      the intensities of those indicating elements that are assigned to the operating action are increased in comparison to the normal operating mode and the intensities of others of the indicating elements are decreased in comparison to the normal operating mode.

10. The electronic device of claim 9, wherein the defined intensities of the indicating elements during normal operating mode are substantially the same.

11. A distributed system comprising:
  a first electronic device according to the electronic device of claim 9; and
  a second electronic device according the electronic device of claim 9, wherein the first and second electronic devices are in communication link with one another.

* * * * *